Jan. 27, 1959    SHIGETADA MIYAZAWA    2,870,646
DEVICE FOR INTERMITTENTLY DRIVING A SHAFT
Filed March 4, 1957    2 Sheets-Sheet 1

SHIGETADA MIYAZAWA
INVENTOR.

BY Wenderoth, Lind and Ponack
ATTORNEYS

Jan. 27, 1959  SHIGETADA MIYAZAWA  2,870,646
DEVICE FOR INTERMITTENTLY DRIVING A SHAFT
Filed March 4, 1957  2 Sheets-Sheet 2
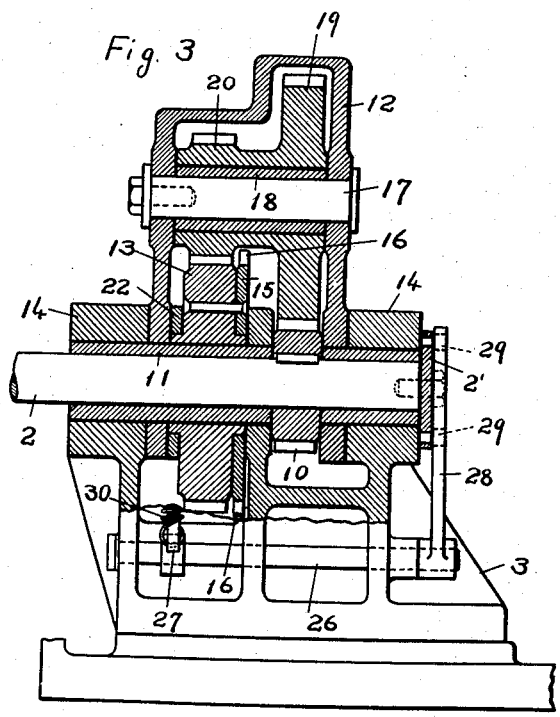
SHIGETADA MIYAZAWA
INVENTOR.
BY Wenderoth, Lind & Ponack
ATTORNEYS

United States Patent Office 2,870,646
Patented Jan. 27, 1959

2,870,646

DEVICE FOR INTERMITTENTLY DRIVING A SHAFT

Shigetada Miyazawa, Kobe, Japan, assignor to Osaka Machine Mfg. Co., Ltd., Osaka, Japan, a company of Japan Application March 4, 1957, Serial No. 643,759

Claims priority, application Japan May 7, 1957

3 Claims. (Cl. 74—394)

This invention relates to a device for intermittently driving a shaft by a continuously rotating one. There are several cases where a shaft is required to rotate in an interval of time while a driving shaft is continuously running, for example, an automatic can-replacing device in a drawing frame, where a can-table is turned in an angle to replace an empty can wherever a can becomes full of sliver while the frame is continuously running for a drawing operation.

The object of this invention is to obtain a device wherein a gearing between a driving shaft and a driven one is normally out of connection, but is connected whenever a motion is supplied from external source and is automatically disconnected when the driven shaft completes one operation.

Figure 1:
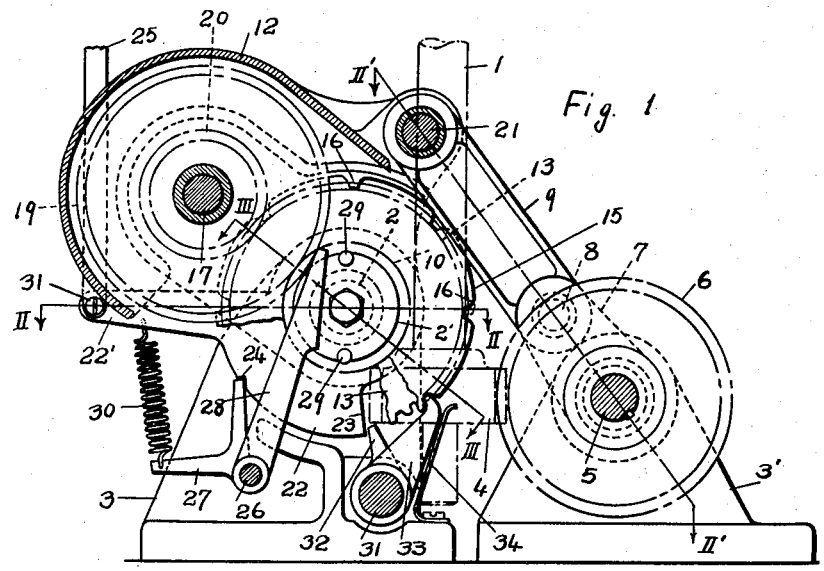
Figure 2:
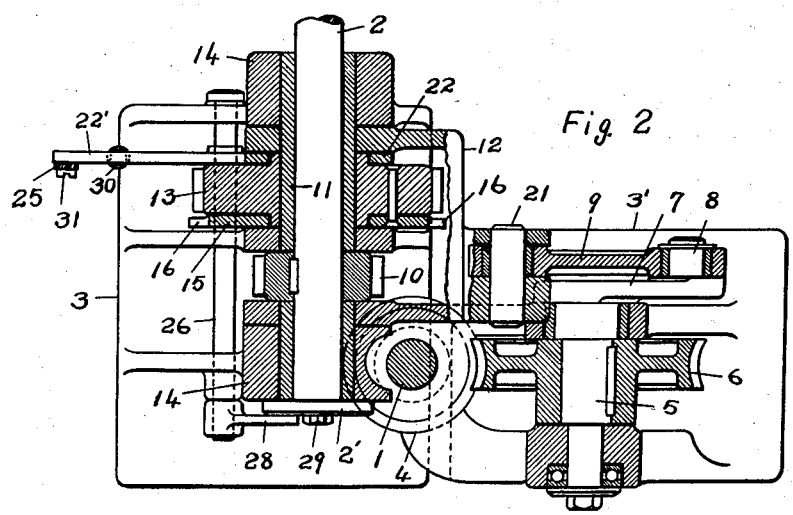

Referring to the accompanying drawing, Figure 1 is a front elevation of a device according to this invention;

Figure 2 is a sectional plan view of Figure 1, taken on lines II—II and II'—II'; and Figure 3 is a sectional view on line III—III of Figure 1.

In the drawing 1 is a continuously revolving shaft driven by a main shaft, not shown, of a machine, and another shaft 2 is to be driven a certain number of revolution, for example, a half revolution, whenever the shaft 1 has revolved a predetermined number. The shafts 1 and 2 are held in bearings on brackets 3 and 3' of the machine frame. A skew gear 4 fixed to the shaft 1 meshes with another skew gear 6 on a shaft 5 so that the latter is driven by the former shaft. A crank arm 7 on the shaft 5 is connected to a pin 21 by a crank pin 8 and a connecting rod 9.

A spur gear 10 is rigidly fixed to the driven shaft 2, and a gear case 12 and a spur gear 13 are loosely fitted on a bush 11 of the shaft. 14 denotes bearing members of the frame. A disc 15 is riveted to one side of the gear, and eight recesses 16 are provided on the periphery of the disc at an equal distance.

On the gear case is mounted a shaft 17 parallel to the shaft 2, and two spur gears 19 and 20 are loosely fitted on a bush 18 of the shaft 17. The two gears are made in one body, and respectively mesh with the gears 10 and 13. The pin 21 is provided on the gear case, so that the latter is rocked in an angle on the shaft 2 when the shaft 5 rotates.

A semi-circular disc 22 is loosely fitted on the boss of the gear 13, and is provided with a radial border 23 and a step 24 on its periphery. This disc has an arm 22' and is connected by a pin 31 to a link 25.

An L-shaped lever 27 and an arm 28 are fixed to a shaft 26 mounted on the bracket. The lever lies in the same plane with the semi-circular disc 22, and the lever 27 is in contact with the periphery of the disc at one end while the other end is connected to the arm 22' through a spring 30 so as to elastically pull with each other. The upper part of the arm 28 is in contact with the end of the shaft 2 where a disc 2' with two projections 29 is secured thereon. A finger 32 and a pawl 33 are secured to a pin 31 mounted on the bracket, and the pawl 33 is elastically pushed by a spring 34. As the pawl is in the same plan with the disc 15, the pawl is intended to get into the recess 16 under the influence of the spring 34. The finger 32 and the semi-circular disc 22 are in the same plane, so that the radial border 23 of the disc pushes the finger 32 when the disc is turned in a counter-clockwise direction, whereby the pawl 33 is driven out of the recess 16 against the spring 34.

The operation of the device is as follows:

The shaft 1 which is continuously rotating drives the shaft 5 through the gears 4 and 6, so that the gear case 12 is continuously rocked. In the normal condition, the semi-circular disc 22 takes a position which has been turned a little angle in a counter-clockwise direction relative to that shown in Figure 1 due to its unbalanced weight as well as the spring 30, and the lever 27 is not supporting the step 24 and the pawl 33 is not in the recess 16 as the finger 32 has been pushed by the radial border 23. The gear 13 is out of connection with the shaft 2, and the gear case freely turns around the stational gear 10.

When the disc 22 is turned a little angle in a clockwise direction by pulling up the link 25, the upper arm of the lever 27 gets into the step under the influence of the spring 30. As the radial border ceases to push the finger 32, the pawl 33 gets into the recess 16, and the gear 13 is now fixed to the frame through the disc 15, so that the gear 10 is turned through the gears 20 and 19 when the gear case is rocked, and the shaft 2 is turned. Figure 1 illustrates the positions of the members at this state of motion.

When the shaft 2 turns a half revolution, and one of the projections 29 at the end of the shaft pushes the front edge of the arm 28, the shaft 26 is turned a little angle in a counter-clockwise direction, and the lever 27 gets out of the step 24, the disc 22 turns in a counter-clockwise direction, and the members resume their normal positions.

The relation between the angle of rotation of the gear case and that of the shaft 2 is determined by the number of teeth of the spur gears 10, 13, 19 and 20. If the number of teeth of the gears 13, 20, 19 and 10 are respectively denoted by letters A, B, C and D, and the angle of rotation of the gears 13, 10 and the gear case are denoted by $Na$, $Nd$ and $Nx$, respectively, the following equation exists.

$$Nd = Na\frac{A}{B}\frac{C}{D} - Nx\left(1 - \frac{A}{B}\frac{C}{D}\right)$$

If $$\frac{AC}{BD}$$

is represented by letter R $$Nd = NaR - Nx(1-R)$$

Suppose A=48, B=24, C=48 and D=24, then $$R=4 \text{ and } Nd=4Na-3Nx$$

If the rocking angle is 60° and the gear A is fixed and the gear case is rocked in one direction, then, as $Nx=\frac{1}{6}$ and $Na=0$, $Nd=-\frac{1}{2}$, that is a half revolution in an opposite direction. This means that if the gear 13 is fixed and the gear case is rocked 60° in a right or left direction, the shaft 2 rotates a half revolution in a left or right direction.

Although this invention can be embodied in any device where a shaft is required to be turned intermittently at an interval of time, it is conveniently applicable to a mechanism for turning a can-table of an automatic can-replacing device in a drawing frame, wherein the table is quickly turned one fourth revolution, for example, when a can becomes full of sliver, so that an empty can takes the place of the full can.

In that case, the shaft 1 is driven through intermediate gears by a shaft which drives a coiler of the drawing frame, and a driving shaft of a can-table is connected through intermediate gears to the shaft 2, and a time limit mechanism which pulls up the link 25 whenever the coiler turned a predetermined number is provided. Then the shaft 2 turns a half revolution at each time when a can becomes full of slivers. If there are four seats of cans on the can-table, and the latter is driven by the shaft 2 through one-half reduction gears, the can-table turns one-fourth revolution at each time, so that an empty can is supplied one by one beneath the coiler.

I claim:

1. An intermittent turning device comprising in combination a gear case, a driven shaft on which said gear case is loosely mounted, a crank pin pivoted to said gear case, a continuously rotating shaft on which said crank pin is mounted, two integral gears having different diameters mounted on the gear case, a gear secured to the driven shaft with which one of said two gears is meshed, a further gear loosely fitted on the driven shaft with which the other of said two gears is meshed, said loosely mounted gear having a recess in the periphery thereof, a frame for the device, a pawl pivoted on the frame for temporarily fixing the loosely mounted gear relative to the frame and engaging in the recess on the periphery of the loosely mounted gear, a spring urging said pawl into the recess, an operating arm engageable with said pawl for disengaging the pawl from the loosely mounted gear when the arm is actuated from outside the device, said arm having a step therein, a lever pivoted on the frame which engages with the step in the operating arm for keeping the arm inactive, and means for pulling the lever from the step when the driven shaft has turned a predetermined number of revolutions.

2. An intermittent turning device as claimed in claim 1 in which the operating arm is pivoted on the driven shaft, the operating arm having a pusher thereon, a further pawl pivoted on the frame for engaging with said pusher, said further pawl and said pawl being connected, whereby the pawl is driven out of the recess against the spring by the pusher when the lever is out of the step in the operating arm.

3. An intermittent turning device as claimed in claim 1, and an arm rigidly fixed on the same shaft with said lever, and projections extending from an end surface of the driven shaft, the upper part of the arm being in contact with the end surface of the shaft so that the arm is pushed by each projection when the driven shaft is rotated, whereby the lever is pivoted out of the step on the operating arm.

References Cited in the file of this patent

UNITED STATES PATENTS

| | | |
|---|---|---|
| 270,893 | Davis | Jan. 23, 1883 |
| 1,727,194 | Belin | Sept. 3, 1929 |
| 2,677,033 | Frey | Apr. 27, 1954 |
| 2,794,350 | Hart | June 4, 1957 |

FOREIGN PATENTS

| | | |
|---|---|---|
| 694,462 | Germany | June 13, 1940 |